A. CALOIARO.
RECORDING DEVICE FOR WEIGHING SCALES.
APPLICATION FILED JULY 18, 1917.

1,354,445. Patented Sept. 28, 1920.
3 SHEETS—SHEET 1.

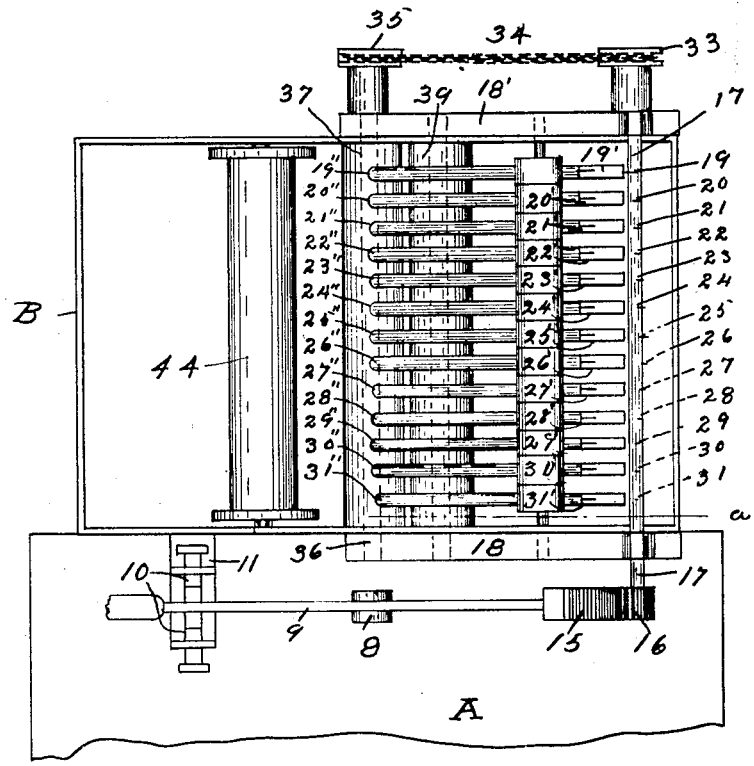

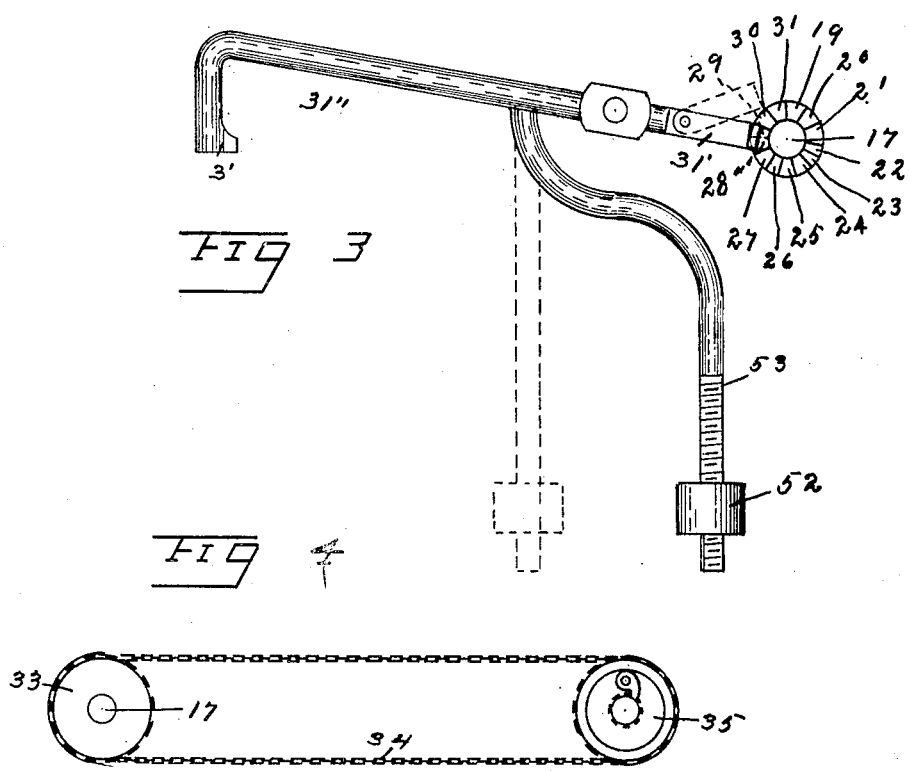

UNITED STATES PATENT OFFICE.

ANGELO CALOIARO, OF SALT LAKE CITY, UTAH.

RECORDING DEVICE FOR WEIGHING-SCALES.

1,354,445.  Specification of Letters Patent.  Patented Sept. 28, 1920.

Application filed July 18, 1917. Serial No. 181,376.

*To all whom it may concern:*

Be it known that I, ANGELO CALOIARO, a citizen of the United States, residing at Salt Lake City, in the county of Salt Lake and State of Utah, have invented a new and useful Improvement in Recording Devices for Weighing-Scales, of which the following is a specification.

This invention relates to scales whereby the weight will be stamped upon a sheet of paper, and has for its objects the fast and quick weighing of the load as it passes over the platform, the saving of time and labor and the doing away with the weighmaster.

With these and other objects in view my invention consists of the following construction and arrangement of parts, to be hereinafter described and claimed.

Reference being had to the drawings forming part of this specification and to the figures of reference marked thereon.

Fig. 2, is a top plan view of Fig. 1, with the ink ribbon, the papers on the roller and the counter balance removed.

Fig. 3, is an enlarged section through Fig. 2, showing the type arm and lift enlarged.

Fig. 4, is an enlarged view of the driving gear.

Similar letters and numerals refer to like parts through the several views of the drawings.

Figure 1:
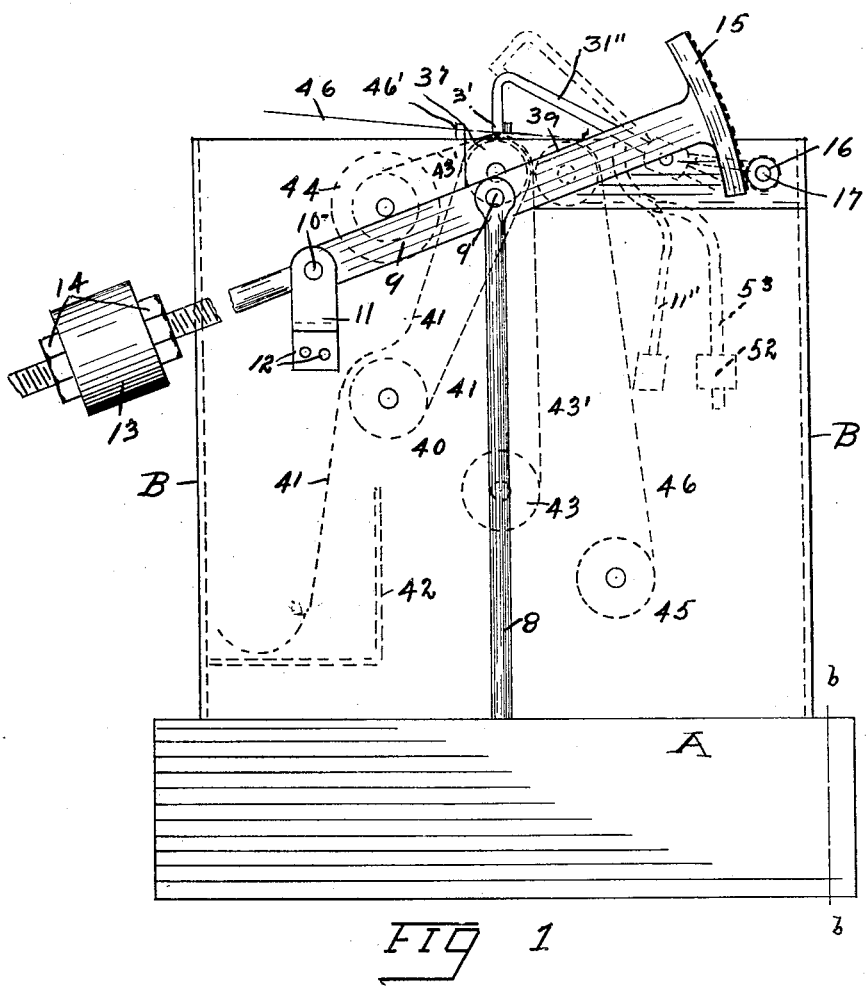
Figure 1, is a front view of a platform scale showing my invention.

A, denotes the platform of a spring controlled scale. B the housing of my invention. A rod 8 connects scales with a beam 9 at 9'. The beam 9 is held in place by bearings 10 which are secured in the bracket 11. The bracket 11 is secured to the casing B by means of bolts 12. Screwed onto the lower end of the beam 9 is a counter balance 13 and secured thereto by means of lock nuts 14. On the upper end of the beam 9 is a toothed segment 15 which operates the gear 16. The gear 16 is secured to a shaft 17 which extends through the reinforcing strips 18 and 18'. Located on the shaft 17 are teeth 19—31 which come into contact with the lifting pins 19'—31' to operate the type arm 19"—31". On the end 3' of the type arm is a number, each arm having a different numeral so that the weight may be indicated upon the paper by the dropping of the type arm.

Secured to one end of the rod 17 is a gear wheel 33 over which travels a chain 34 and over the ratchet wheel 35 provided with a pawl, said wheel being secured to a shaft 36 that extends through the roller 37 thus forming the driving gear for the upper rollers 37 and 39.

The reinforcing strips 18 and 18' support the bearings for the shaft 17 and the rollers 37 and 39.

Upon the roller 40 is placed a roll of paper 41 which passes upward and between the rollers 37 and 39 and then over the roller 37 and then down into the receiving box 42 which is in the casing B. Placed upon the roller 43 is an inked ribbon 43' which passes upward and between the rollers 37 and 39 and over the paper and then onto the roller 43. Placed upon the roller 45 is a roll of paper 46 which passes upward and over the roller 39 and over the ribbon 43' under the type arms and out through the cutting knife 46'.

When a load is placed on the scale, the same descends a distance corresponding to the weight of the load, and hence the rod 8 pulls the end of the beam 9 having the segment gear 15, downwardly a corresponding distance, and said gear coöperates with the gear 16 to partly turn the shaft 17. Certain or all of the lifting pins on said shaft, according to the load weighed, operate in succession on the inner ends of the type arms. As each pin moves downwardly, it engages and depresses the inner end of the associated type arm, thereby raising the type end of said arm and as said pin moves past said arm the latter by its own weight, assisted by the weight 52, drops and prints its numeral on the paper. The weight 52 then restores the type arm to normal position.

When the weighed load is removed the rod 8 moves upwardly, imparting corresponding movement to the gear 15 of the beam 9 and hence turning the shaft 17 back to its initial position. The inner end of each type arm includes a rule joint, as indicated in Fig. 3, and hence the pin of the shaft 17 is permitted to lift and pass said rule jointed end, as indicated in dotted lines in said figure. A number of the type arms will be operated, according to the weight of the load and corresponding extent of movement of the rod 8, beam 9, and shaft 17, the highest number printed by the several arms being referred to as recording the weight of the load, as will be understood.

As the beam 9 is lowered the ratchet wheel is also released thus preventing the rollers 37 and 39 being moved backward by the dropping of the beam.

The type arm is regulated to strike as hard as desired by raising or lowering the weight 52 on the lever 53.

Having thus described the parts of my invention what I claim as new and desire to secure by Letters Patent, is:—

1. A recording device comprising a shaft mounted for rotation and having an operating pin, a type arm pivotally mounted, having a type at the outer end and having the inner end arranged in the path of movement of said pin and provided with a rule joint, said type arm also having a depending weighted arm to normally raise the typed end of said arm, and means to turn said shaft, said means including an element for connection to a spring controlled scale.

2. A recording device comprising a shaft mounted for rotation and having an operating pin, a type arm pivotally mounted, having a type at the outer end and having the inner end arranged in the path of movement of said pin and provided with a rule joint, said type arm also having a depending weighted arm to normally raise the typed end of said arm, and means to turn said shaft comprising a gear on said shaft, a pivotally mounted beam having a weight at one end and a segment gear at the other end engaging the first named gear, and a rod pivotally connected to the beam and arranged for connection to a spring controlled scale.

3. A recording device comprising a shaft mounted for rotation and having an operating pin, a type arm pivotally mounted, having a type at the outer end and having the inner end arranged in the path of movement of said pin and provided with a rule joint, said type arm also having a depending weighted arm to normally raise the typed end of said arm, means to run said shaft, said means including an element for connection to a spring controlled scale, a roller on which the type strikes, an inked ribbon arranged over said roller, a paper roll to draw a slip of paper over said roller, and connections between said paper roll and said shaft, to cause said paper roll to be driven from said shaft.

ANGELO CALOIARO.

Witnesses:
A. R. RUSSO,
EDNA ARNOLD.